United States Patent
Seo et al.

(10) Patent No.: US 11,175,186 B2
(45) Date of Patent: Nov. 16, 2021

(54) OPTICAL IMAGING APPARATUS USING METAMATERIAL AND OPTICAL IMAGING METHOD USING METAMATERIAL

(71) Applicants: KOREA INSTITUTE OF SCIENCE AND TECHNOLOGY, Seoul (KR); Center for Advanced Meta-Materials, Daejeon (KR)

(72) Inventors: Minah Seo, Seoul (KR); Sang-Hun Lee, Seoul (KR); Chulki Kim, Seoul (KR); Jae Hun Kim, Seoul (KR); Taikjin Lee, Seoul (KR); Deok Ha Woo, Seoul (KR)

(73) Assignees: Korea Institute of Science and Technology, Seoul (KR); Center for Advanced Meta-Materials, Daejeon (KR)

( * ) Notice: Subject to any disclaimer, the term of this patent is extended or adjusted under 35 U.S.C. 154(b) by 0 days.

(21) Appl. No.: 16/809,275

(22) Filed: Mar. 4, 2020

(65) Prior Publication Data

US 2020/0284660 A1    Sep. 10, 2020

(30) Foreign Application Priority Data

Mar. 6, 2019    (KR) .................. 10-2019-0025928

(51) Int. Cl.
*G01J 5/08* (2006.01)
*G02B 1/00* (2006.01)
*G01J 5/00* (2006.01)

(52) U.S. Cl.
CPC .......... *G01J 5/0803* (2013.01); *G02B 1/002* (2013.01); *G01J 2005/0077* (2013.01)

(58) Field of Classification Search
CPC .......... G01J 5/0803; G01J 2005/0077; G01J 3/2823; G01J 2003/2826; G01J 3/42;
(Continued)

(56) References Cited

U.S. PATENT DOCUMENTS

| 7,405,866 B2 * | 7/2008 | Kuekes | ................. G02F 1/0126 |
| | | | 359/245 |
| 2014/0131559 A1 * | 5/2014 | Yen | ........................ G02B 1/002 |
| | | | 250/221 |

FOREIGN PATENT DOCUMENTS

KR    10-2007-0086427 A    8/2007

OTHER PUBLICATIONS

Korean Office Action dated Apr. 17, 2020.

* cited by examiner

*Primary Examiner* — David P Porta
*Assistant Examiner* — Meenakshi S Sahu
(74) *Attorney, Agent, or Firm* — Rabin & Berdo, P.C.

(57) ABSTRACT

One embodiment of the present invention provides an optical imaging apparatus using a metamaterial including a metamaterial array sensor which includes a plurality of unit cells made of a metamaterial and is positioned adjacent to an observation object, an imaging beam providing unit which provides an imaging beam toward the metamaterial array sensor, a control beam providing unit which controls a control beam provided to the unit cell to block the imaging beam incident on the unit cell, and an imaging beam measuring unit which measures a unit cell imaging beam transmission amount passing through the unit cell by measuring an imaging beam transmission amount of the metamaterial array sensor when the imaging beam passes through the unit cell and an imaging beam transmission amount of the metamaterial array sensor when the control beam is focused on the unit cell to block the imaging beam incident on the unit cell.

9 Claims, 6 Drawing Sheets

(58) Field of Classification Search
CPC ....... G01J 3/2803; G02B 1/002; G02B 27/00; H01L 31/04; G01N 21/59
See application file for complete search history.

OPTICAL IMAGING APPARATUS USING METAMATERIAL AND OPTICAL IMAGING METHOD USING METAMATERIAL

CROSS-REFERENCE TO RELATED APPLICATION

The present invention claims priority under 35 U.S.C. § 119 to Korean Application No. 10-2019-0025928 filed on Mar. 6, 2019, the entire content of which is incorporated herein by reference.

BACKGROUND

1. Field of the Invention

The present invention relates to an optical imaging apparatus using a metamaterial and an optical imaging method using a metamaterial, and more particularly, to an optical imaging apparatus using a switching metamaterial, which is capable of overcoming a diffraction limit and adjusting transmittance of an imaging beam with respect to an individual unit metamaterial in optical imaging using a metamaterial array, and an optical imaging method using a switching metamaterial.

2. Discussion of Related Art

Optical imaging technology has accuracy, processing precision, and productivity which are superior to those of any other methods. However, the optical imaging technology has come to a bottleneck in developing high resolution imaging technology because the resolution thereof cannot be shorter than a wavelength due to a diffraction limit. As one of methods of overcoming a resolution limit due to a diffraction limit, a metamaterial having a negative refractive index has been developed, and a high resolution beyond a diffraction limit may be obtained by introducing the metamaterial into an imaging system. Meanwhile, a metamaterial is a material (metamaterial array) in which unit cells designed with a metal or dielectric material are arranged in a regular array and is a new concept material having properties such as an ultra high refractive index and a negative refractive index which do not exist in nature.

As described above, it has been reported that an observation object may be observed by bringing the observation object into contact with a metamaterial to amplify optical properties of the observation object. In particular, unlike a visible light region, in a terahertz frequency band, there are inherent resonance (rotation, vibration, intermolecular and intramolecular) frequencies of many molecules, which are referred to as peculiar fingerprint spectra. By using a metamaterial, it is possible to amplify and observe the peculiar fingerprint spectra even in a trace amount of molecules that has been unobservable in the past. When a molecule with a peculiar fingerprint spectrum is observed, a principle is used in which a signal is amplified by matching a resonance frequency of the metamaterial with a frequency thereof. When an observation object is brought into contact with a metamaterial array and transmittance thereof is two-dimensionally scanned, amplified optical properties of the observation object may be obtained as a two-dimensional image. Recently, a method of optically controlling optical properties of a metamaterial has also been studied. For example, since optical properties of a metamaterial are sensitive to an electric charge density in a near field region, the electric charge density may be increased through optical pumping, thereby adjusting transmittance of light passing through the metamaterial.

In this regard, a spatial distribution of optical properties of an observation object may be observed more precisely as a spatial resolution of an image of the observation object becomes higher. The spatial resolution of an optical image is limited by a diffraction limit. Even in the case of two-dimensional imaging using a metamaterial array, since an imaging beam concurrently passes through adjacent metamaterials at a level less than or equal to a diffraction limit, spatial distribution may still not be seen at a level less than or equal to the diffraction limit.

SUMMARY OF THE INVENTION

The present invention is directed to providing an optical imaging apparatus using a metal material, in which, in optical imaging using a metamaterial array, a transmission amount and transmittance of an imaging beam with respect to an individual unit metamaterial may be obtained using a control beam, thereby acquiring an optical analysis image of an observation object having a spatial resolution at a level of a unit metamaterial irrespective of a diffraction limit of the imaging beam, and an optical imaging method using a metal material.

Technical objects of the present invention are not particularly limited to those described above, and other technical objects not described herein will also be clearly understood from the following description by a person skilled in the art of the technical field to which the invention pertains.

According to an aspect of the present invention, there is provided an optical imaging apparatus using a metamaterial including a metamaterial array sensor which includes a plurality of unit cells made of a metamaterial and is positioned adjacent to an observation object, an imaging beam providing unit which provides an imaging beam toward the metamaterial array sensor, a control beam providing unit which controls a control beam provided to the unit cell to block the imaging beam incident on the unit cell, and an imaging beam measuring unit which measures a unit cell imaging beam transmission amount passing through the unit cell by measuring an imaging beam transmission amount of the metamaterial array sensor when the imaging beam passes through the unit cell and an imaging beam transmission amount of the metamaterial array sensor when the control beam is focused on the unit cell to block the imaging beam incident on the unit cell.

The optical imaging apparatus may further include an image acquiring unit which acquires an optical analysis image of the observation object, which has a spatial resolution corresponding to a size of the metamaterial constituting the unit cell, by using the unit cell imaging beam transmission amount, which is measured by the imaging beam measuring unit, with respect to each of the plurality of unit cells.

A size of the metamaterial constituting the unit cell may be smaller than a diffraction limit of the imaging beam.

The control beam may have a spot size that is preset to correspond to a size of the metamaterial constituting the unit cell.

The imaging beam may be in a form of a terahertz wave, and the control beam may have a wavelength in a visible light wavelength range.

According to another aspect of the present invention, there is provided an optical imaging method using a metamaterial, including a) providing an imaging beam toward a metamaterial array sensor which includes a plurality of unit cells made of a metamaterial and is positioned adjacent to an observation object, b) controlling a control beam provided to the unit cell to block the imaging beam incident on the unit cell, and c) measuring a unit cell imaging beam transmission amount passing through the unit cell by measuring an imaging beam transmission amount of the metamaterial array sensor when the imaging beam passes through the unit cell and an imaging beam transmission amount of the metamaterial array sensor when the control beam is focused on the unit cell to block the imaging beam incident on the unit cell.

The optical imaging method may further include d) acquiring an optical analysis image of the observation object, which has a spatial resolution corresponding to a size of the metamaterial constituting the unit cell, by using the unit cell imaging beam transmission amount with respect to each of the plurality of unit cells, which is measured according to operation c).

A size of the metamaterial constituting the unit cell may be smaller than a diffraction limit of the imaging beam.

The control beam may have a spot size that is preset to correspond to a size of the metamaterial constituting the unit cell.

The imaging beam may be in a form of a terahertz wave, and the control beam may have a wavelength in a visible light wavelength range.

DETAILED DESCRIPTION OF EXEMPLARY EMBODIMENTS

Hereinafter, the present invention will be described in detail with reference to the accompanying drawings. However, the present invention may be implemented in several different forms and thus is not limited to the embodiments described herein. In addition, the accompanying drawings are used to easily understand the embodiments presented herein, and the technical spirit presented herein is not limited by the accompanying drawings. As such, it should be understood that the present invention should be construed to extend to any alterations, equivalents and substitutes that are included within the spirit and scope of the present invention.

Parts which are not associated with the description are not illustrated in the drawings in order to clearly describe the present invention, the size, form, and shape of each component shown in the drawings may be variously modified, and like reference numerals refer to like elements throughout the specification.

In addition, suffixes "module" and "unit" used for components disclosed in the following description are merely given or interchangeably used to facilitate a description of the specification, and the suffix itself does not give any special meaning or function. Also, in describing the embodiments presented herein, the detailed description will be omitted when a specific description for publicly known technologies to which the present invention pertains is judged to obscure the gist of the embodiments presented herein.

Throughout the specification, in a case in which one component is described as being "connected (joined, in contact with, or coupled)" to another component, such a description includes both a case in which one component is "connected (joined, in contact with, or coupled)" directly to another component and a case in which one component is "connected (joined, in contact with, or coupled)" indirectly to another component with still another component disposed between one component and another component. In addition, unless explicitly described to the contrary, the term "comprise (include or have)" will be understood to imply the inclusion of stated components but not the exclusion of any other components.

Terms used herein are used for describing a specific embodiment and do not limit the present invention. A singular form includes a plurality of forms unless it is clearly represented otherwise, and components that are distributed and implemented may be implemented in a combined form unless a particular limitation. In this specification, a term "comprise" or "have" indicates presence of a characteristic, numeral, step, operation, element, component, or combination thereof described in the specification and does not exclude presence or addition of at least one characteristic, numeral, step, operation, element, component, or combination thereof.

It will be understood that, although terms "first and second" used herein may be used to describe various components, the components should not be limited by these terms. The terms are only used to distinguish one element from another component. For example, a first component could be termed a second component, and, similarly, a second component could be termed a first component, without departing from the scope of the present invention.

Figure 1:
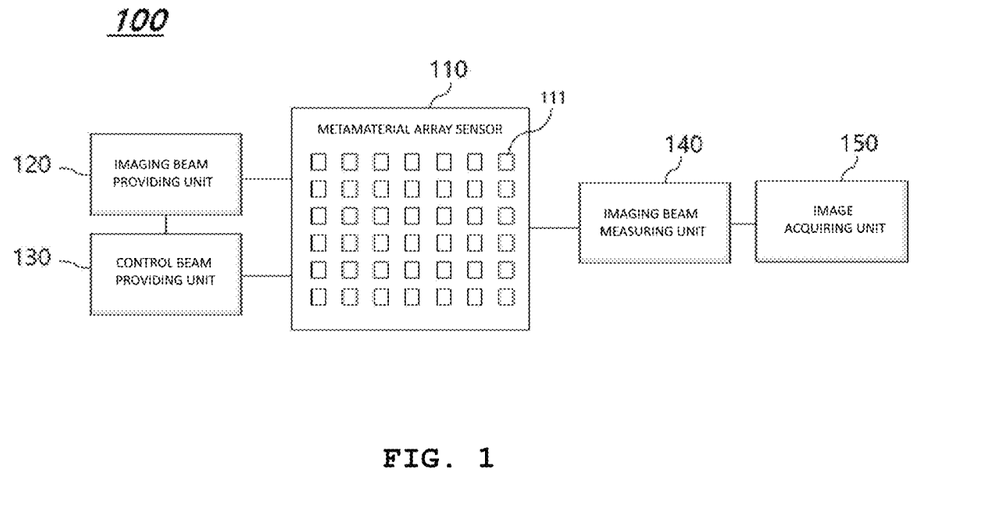
FIG. 1 is a block diagram illustrating a schematic configuration of an optical imaging apparatus using a metamaterial according to one embodiment of the present invention.
Figure 2:
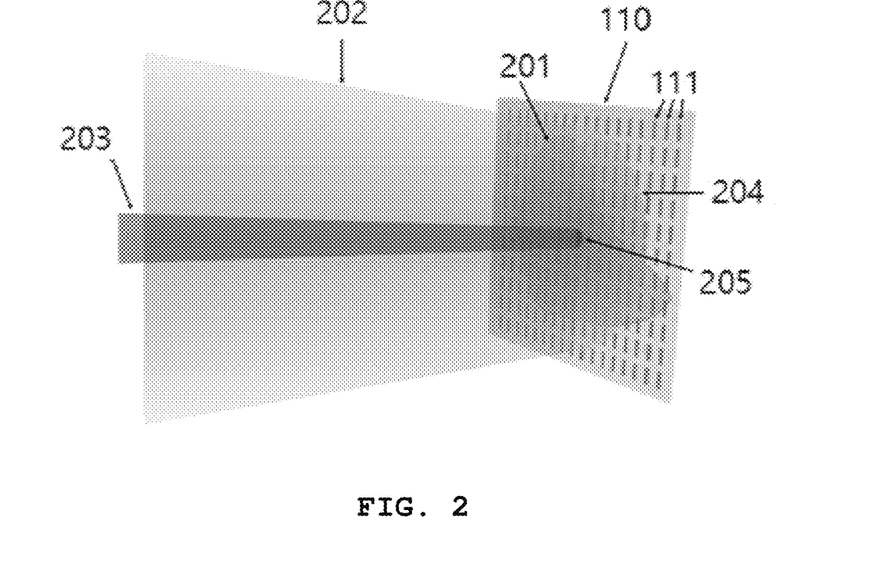
FIG. 2 is a diagram visually illustrating imaging of an observation object using the optical imaging apparatus using a metamaterial.

FIG. 1 is a block diagram illustrating a schematic configuration of an optical imaging apparatus using a metamaterial (hereinafter, referred to as an optical imaging apparatus 100 using a metamaterial) according to one embodiment of the present invention, and FIG. 2 is a diagram visually illustrating imaging of an observation object using the optical imaging apparatus 100 using a metamaterial.

Prior to the detailed description being set forth, the concept of the present invention will be briefly described. In optical imaging, when a diffraction limit spot size of an imaging beam is greater than a size of an observation object, a detailed spatial shape of the observation object is not imaged. According to the present invention, a resolution of an image is increased by reducing an actual spot size to a level of a unit metamaterial using a metamaterial array sensor and a control beam. Here, the control beam serves to change optical properties of the unit metamaterial to transmit or block an imaging beam incident on the unit metamaterial. In addition, the unit metamaterial (unit cell) is made to be smaller than a diffraction limit of the imaging beam, and the control beam has a spot size small enough to be separately incident on each unit metamaterial. In this case, a difference between transmission amounts of an imaging beam generated by turning a control beam on and off corresponds to a transmission amount of the imaging beam passing through the unit metamaterial. When a difference between transmission amounts according to the presence and absence of a control beam is measured in all unit metamaterials of an array, an image, of which an actual resolution corresponds to a level of a unit metamaterial, may be acquired.

Referring to FIG. 1, the optical imaging apparatus 100 using a metamaterial includes a metamaterial array sensor 110, an imaging beam providing unit 120, a control beam providing unit 130, and an imaging beam measuring unit 140 and may further include an image acquiring unit 150.

The metamaterial array sensor 110 includes a plurality of unit cells 111 made of a metamaterial and is positioned adjacent to an observation object. Referring to FIG. 2, it may be confirmed that the metamaterial array sensor 110 is positioned adjacent to an observation object 201.

Figure 3:
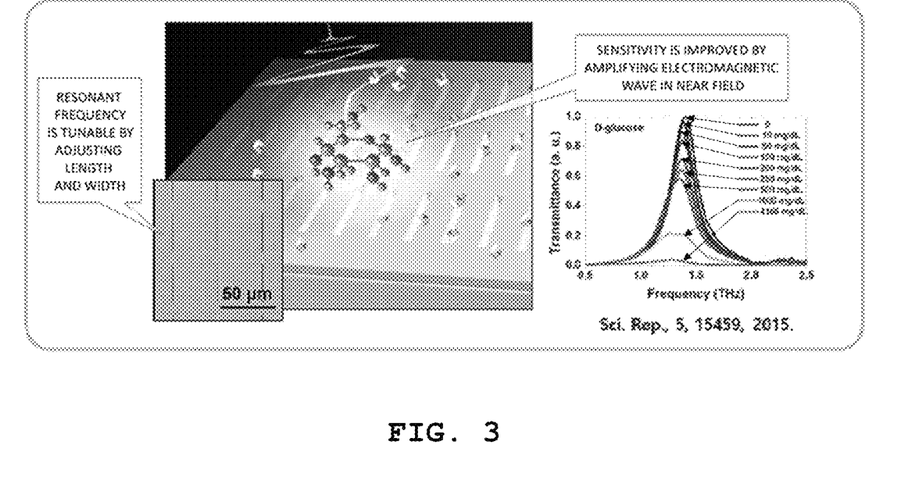
FIG. 3 is a diagram illustrating a metamaterial array applied to embodiments of the present invention.

In addition, referring to FIG. 3 which illustrates a metamaterial array applied to embodiments of the present invention, a metamaterial applied to the metamaterial array sensor 110 may be prepared by designing a unit metamaterial having high transmittance in a frequency band in which imaging is performed. As a result, optical properties of the observation object in contact with the metamaterial array may be sensitively observed through near field amplification of the metamaterial. It is possible to design a metamaterial specialized according to properties of the observation object. In addition, in a slot antenna array, a transmission frequency band may be determined according to a length, width, and thickness of a slot, and sensitivity may be increased according to amplification of an electromagnetic wave in a near field. Thus, the slot antenna array has a structure suitable for an application of a metamaterial array sensor and an optical imaging apparatus and method using a metamaterial including the same according to the present invention.

The imaging beam providing unit 120 provides an imaging beam to the metamaterial array sensor 110. Here, the imaging beam may have the same form as the imaging beam 202 shown in FIG. 2.

The control beam providing unit 130 controls a control beam provided to the unit cell 111 to block the imaging beam incident on the unit cell 111. That is, the control beam providing unit 130 controls turn-on or off of the control beam. In this case, the control beam may have the same form as a control beam 203 shown in FIG. 2.

The above-described imaging beam may be in a form of a terahertz wave, and the above-described control beam may have a wavelength in a visible light wavelength range, but the present invention is not limited thereto.

The imaging beam measuring unit 140 measures a unit cell imaging beam transmission amount passing through the unit cell by measuring an imaging beam transmission amount of the metamaterial array sensor 110 when the imaging beam passes through the unit cell 111 and an imaging beam transmission amount of the metamaterial array sensor 110 when the control beam is focused on the unit cell 111 to block the imaging beam incident on the unit cell 111.

Figure 4:
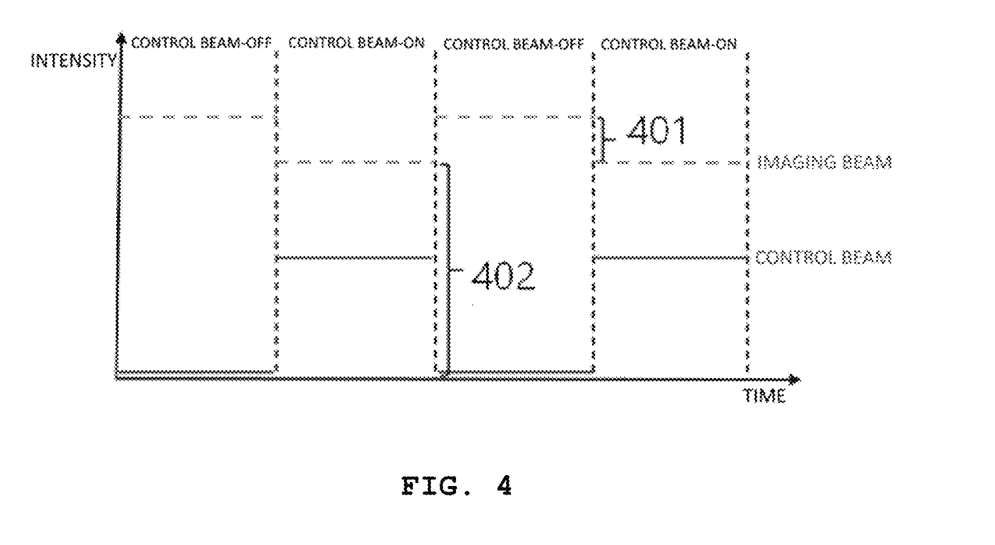
FIG. 4 is a graph showing that a transmission amount is determined in a unit metamaterial shown in FIG. 2.

Referring to FIG. 4 illustrating that a transmission amount is determined in the unit metamaterial shown in FIG. 2, by using the control beam providing unit 130, a control beam may be focused on one unit cell to switch only transmission of an imaging beam in the one unit cell. A difference between transmission amounts of switch-on and switch-off may correspond to transmission in the one unit cell. In other words, in the case of the metamaterial array sensor 110, when a control beam focused on the unit cell is turned off, a transmission amount is increased, and when a control beam focused on the unit cell is turned on, a transmission amount is decreased. A difference between the transmission amounts becomes a transmission amount 401 of an imaging beam with respect to a unit cell. A transmission amount of the metamaterial array sensor 110 when a control beam is turned on becomes a transmission amount 402 of an imaging beam with respect to the remaining unit cells excluding the unit cell.

The image acquiring unit 150 acquires an optical analysis image of the observation object, which has a spatial resolution corresponding to a size of a metamaterial constituting the unit cell 111, by using a unit cell imaging beam transmission amount with respect to each of the plurality of unit cells 111, which is measured by the imaging beam measuring unit 140.

Figure 5:
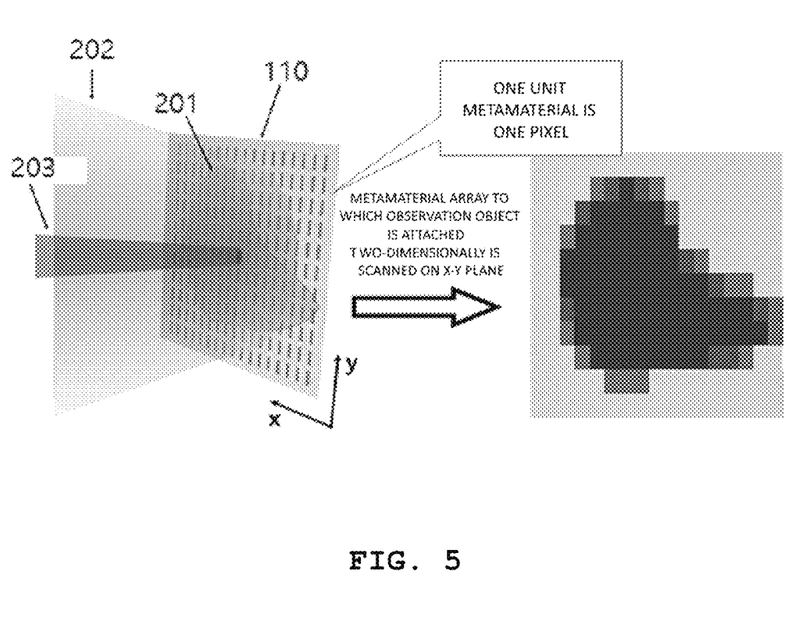
FIG. 5 shows diagrams illustrating an image of an observation object acquired using the optical imaging apparatus shown in FIG. 2.

Referring to FIG. 5, a two-dimensional scan image of the metamaterial array sensor 110 to which the observation object is attached may be acquired on an x-y plane. When determining transmittance in a unit metamaterial (unit cell) is repeated by performing two-dimensional scanning, an image having a size of a unit metamaterial as one pixel may be acquired, and a spatial resolution may be determined as the size of the unit metamaterial. Therefore, in a current terahertz electromagnetic wave region, there is currently no microscope technology at a scale of $1/10,000$ that exceeds an optical limit. Thus, the present invention may be applied to achieve a high resolution in infrared and terahertz regions using a nano metamaterial array and a visible light control beam.

Meanwhile, a size of the metamaterial constituting the unit cell 111 may be smaller than a diffraction limit of the imaging beam. In addition, the control beam may have a spot size that is preset to correspond to the size of the metamaterial constituting the unit cell 111. Referring to FIG. 2, it may be confirmed that the size of the metamaterial constituting the unit cell 111 corresponds to a diffraction limit spot size 204 of the control beam 203.

Figure 6:
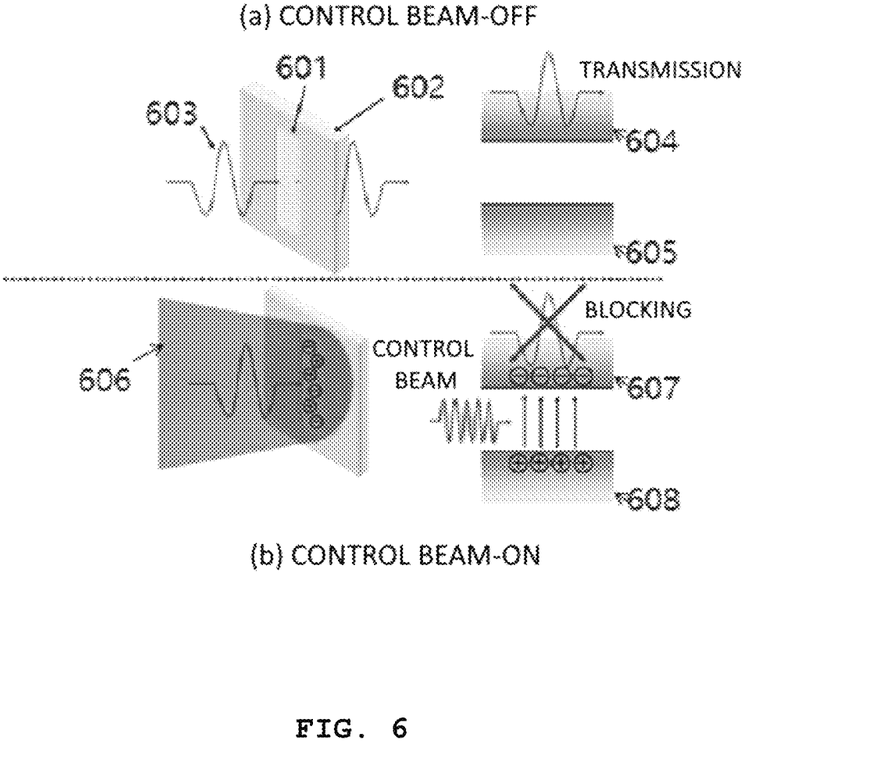
FIG. 6 is a set of diagrams illustrating an example of the optical imaging apparatus using a metamaterial according to one embodiment.
Figure 7:
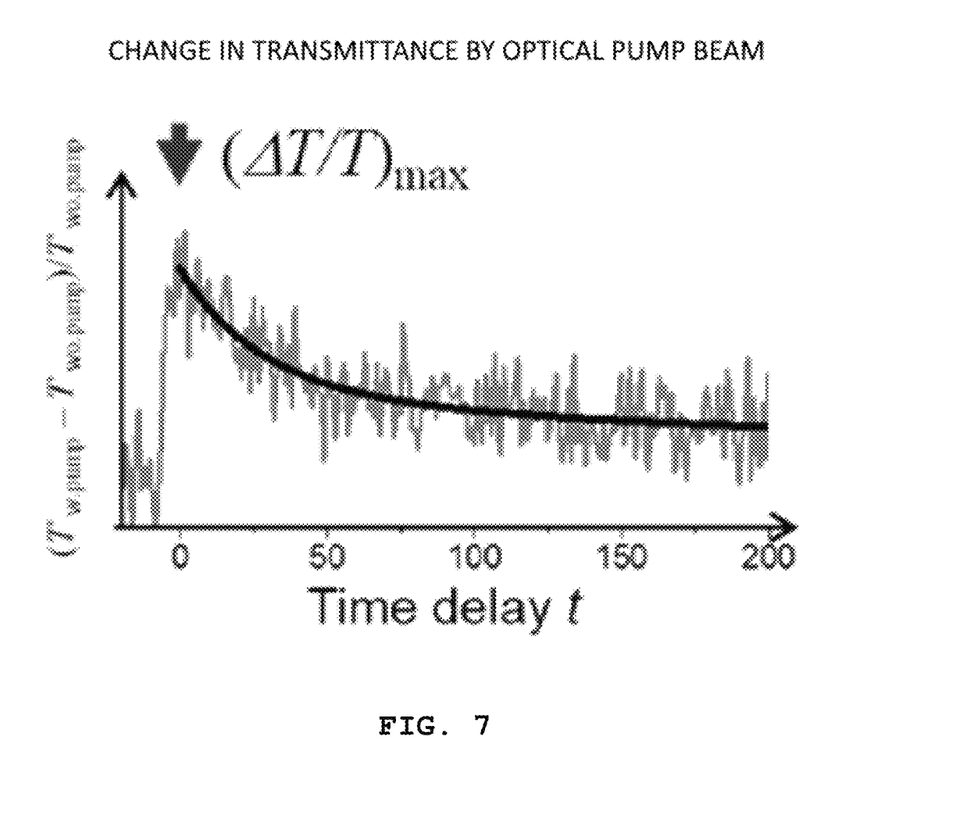
FIG. 7 is a graph showing a change in transmittance according to one embodiment of the present invention shown in FIG. 6.

FIG. 6 is a set of diagrams illustrating the optical imaging apparatus 100 using a metamaterial according to one embodiment, and FIG. 7 is a graph showing a change in transmittance according to one embodiment of the present invention shown in FIG. 6.

According to one embodiment of the invention, a unit metamaterial may be designed to optically switch transmittance of a cut-off frequency band. As a transmittance switching mechanism, there are various methods including refractive index tuning by a thermal effect and impact ionization by forming a conductive channel through photoexcitation of electric charges. As shown in FIG. 6, a slot antenna array 601 manufactured on a semiconductor substrate 602 may be implemented to control transmittance in a band of a terahertz wave 603 using photoexcitation.

Specifically, the slot antenna array 601 made of a metal and manufactured on the semiconductor substrate 602 transmits the terahertz wave 603 at a resonant frequency. As in the case of control beam-off as shown in FIG. 6A, when a control beam is not incident on the slot antenna array 601, electric charges are not excited in a substrate conduction band 604 and a substrate valence band 605. However, as in the case of control beam-on as shown in FIG. 6B, when a control beam 606 having bandgap energy or more is incident on the slot antenna array 601, electric charges are exited in a substrate between the substrate conduction band 607 and the substrate valence band 608, and transmission of a terahertz wave is blocked by the excited electric charges.

As shown in FIG. 6, when transmittance is measured with respect to the slot antenna array manufactured on the semiconductor substrate using a terahertz wave as an imaging beam, a wavelength of a control beam may be selected such that energy of the control beam is greater than or equal to a bandgap energy of the substrate. When a control beam is turned off, a terahertz wave corresponding to a resonant frequency of a slot is transmitted. On the other hand, when the control beam is turned on, the control beam excites electric charges in the substrate, and thus transmission of a terahertz wave is blocked. When a transmittance difference is analyzed by turning the control beam on and off, as shown in FIG. 7, it is possible to obtain transmittance of an imaging beam with respect to a corresponding individual unit metamaterial.

As described above, the present invention may be suitable for imaging using a long wavelength greater than or equal to that of a terahertz wave. When a control beam in a visible light region and a nano metamaterial are used, it is possible to obtain a resolution that is at least hundreds of times smaller than a wavelength. In addition, the present invention may be easily combined with terahertz time domain spectroscopy and used. When a biomaterial is imaged using a long wavelength greater than or equal to that of a terahertz wave, a low spatial resolution, which makes it difficult to distinguish a biological structure, has been a limitation. Thus, the present invention may be utilized in fields such as medicine and pharmaceuticals by facilitating imaging of a biomaterial in a long wavelength.

Figure 8:
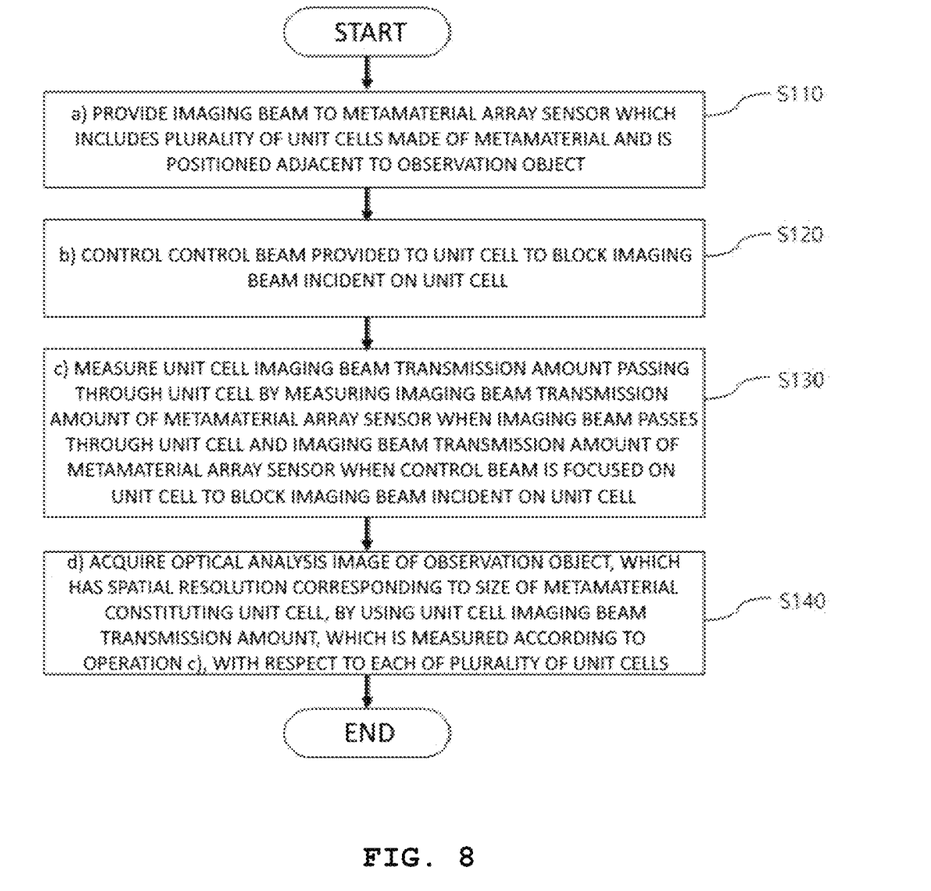
FIG. 8 is a flowchart illustrating a procedure of an optical imaging method using a metamaterial according to another embodiment of the present invention.

FIG. 8 is a flowchart illustrating a procedure of an optical imaging method using a metamaterial according to another embodiment of the present invention. The optical imaging method using a metamaterial according to the present embodiment corresponds to an optical imaging method using the optical imaging apparatus 100 using a metamaterial, which has been described with reference to FIGS. 1 to 7. Therefore, hereinafter, the same contents as in the above descriptions will be omitted, and all of the following procedures mean functions performed by the optical imaging apparatus 100 using a metamaterial.

The optical imaging method using a metamaterial according to the present embodiment provides an optical imaging method using a metamaterial, which includes a) providing an imaging beam to a metamaterial array sensor which includes a plurality of unit cells made of a metamaterial and is positioned adjacent to an observation object (S110), b) controlling a control beam provided to the unit cell to block the imaging beam incident on the unit cell (S120), and c) measuring a unit cell imaging beam transmission amount passing through the unit cell by measuring an imaging beam transmission amount of the metamaterial array sensor when the imaging beam passes through the unit cell and an imaging beam transmission amount of the metamaterial array sensor when the control beam is focused on the unit cell to block the imaging beam incident on the unit cell (s130).

In the present embodiment, the optical imaging method may further include d) acquiring an optical analysis image of the observation object, which has a spatial resolution corresponding to a size of the metamaterial constituting the unit cell, by using the unit cell imaging beam transmission amount with respect to each of the plurality of unit cells, which is measured according to operation c) (S140).

In the present embodiment, the size of the metamaterial constituting the unit cell may be smaller than a diffraction limit of the imaging beam.

In the present embodiment, the control beam may have a preset spot size that is preset to correspond to the size of the metamaterial constituting the unit cell.

In the present embodiment, the imaging beam is in a form of a terahertz wave, and the control beam may have a wavelength in a visible light wavelength range.

As described above, the present invention relates to a method of achieving ultra high resolution imaging using a metamaterial array sensor. In the present invention, by bringing a metamaterial array sensor and an observation object into contact with each other and using an imaging optical beam for measuring transmittance thereof together with a control optical beam for individually switching transmittance of the imaging beam in a unit metamaterial, an image is acquired by two-dimensionally scanning a difference between transmission amounts of an imaging beam generated when the unit metamaterial is switched. Since the acquired image has a spatial resolution by as much as a size of the unit metamaterial irrespective of a diffraction limit of an imaging beam, ultra high resolution imaging may be achieved by using a metamaterial array in which a size of a unit metamaterial is smaller than a diffraction limit.

According to embodiments of the present invention, a control beam capable of switching transmittance of an imaging beam is focused on one unit metamaterial. A difference between intensities of a transmitted imaging beam generated by turning a control beam on and off corresponds to intensity of an imaging beam passing through a corresponding unit metamaterial. When the same measurement is performed on all unit metamaterials in a metamaterial array, an image having a spatial resolution as large as a size of the unit metamaterial is acquired irrespective of a diffraction limit of an imaging beam in an array area.

According to the present invention, in optical imaging, it is possible to obtain a transmission amount and transmittance of an imaging beam with respect to an individual unit metamaterial and to acquire an optical analysis image in which a spatial resolution of imaging is increased to a level of a size of a unit metamaterial irrespective of a diffraction limit.

In addition, according to the present invention, in imaging using a long wavelength greater than or equal to that of a terahertz wave, when a control beam in a visible light region and a nano metamaterial are used, it is possible to obtain a resolution that is at least hundreds of times smaller than a wavelength. Furthermore, the present invention may be easily combined with terahertz time domain spectroscopy and used. When a biomaterial is imaged using a long wavelength greater than or equal to that of a terahertz wave, it is possible to solve a problem in occurrence of a low spatial resolution which makes it difficult to distinguish a biological structure. Thus, the present invention may be utilized in fields such as medicine and pharmaceuticals by facilitating imaging of a biomaterial in a long wavelength.

It should be understood that the effects of the present invention are not particularly limited to those described above, and the present invention includes all effects that can be deduced from the detailed description of the present invention or the configurations of the invention described in the claims.

The description of the present invention is intended for illustration, and those skilled in the art will appreciate that the present invention can be easily modified in other detailed forms without changing the technical spirit or essential features of the present invention. Therefore, the above-described embodiments should be understood as being exemplary rather than restrictive. The scope of the present invention should be defined by the accompanying claims rather than by the detailed description, and all changes or modifications derived from the meanings and scopes of the claims and equivalents thereof should be construed as being included in the scope of the present invention.

What is claimed is:

1. An optical imaging apparatus using a metamaterial, comprising:
   a metamaterial array sensor which includes a plurality of unit cells made of a metamaterial and is positioned adjacent to an observation object;
   an imaging beam providing unit which provides an imaging beam toward the metamaterial array sensor;
   a control beam providing unit which controls a control beam provided to a unit cell to block an imaging beam incident on the unit cell;
   an imaging beam measuring unit which measures a unit cell imaging beam transmission amount passing through the unit cell by measuring an imaging beam transmission amount of the metamaterial array sensor when the imaging beam passes through the unit cell and an imaging beam transmission amount of the metamaterial array sensor when the control beam is focused on the unit cell to block the imaging beam incident on the unit cell; and
   an image acquiring unit which acquires an optical analysis image of the observation object, which has a spatial resolution corresponding to a size of the metamaterial constituting the unit cell, by using the unit cell imaging beam transmission amount, which is measured by the imaging beam measuring unit, with respect to each of the plurality of unit cells.

2. The optical imaging apparatus of claim 1, wherein a size of the metamaterial constituting the unit cell is smaller than a diffraction limit of the imaging beam.

3. The optical imaging apparatus of claim 1, wherein the control beam has a spot size that is preset to correspond to a size of the metamaterial constituting the unit cell.

4. The optical imaging apparatus of claim 1, wherein the imaging beam is in a form of a terahertz wave, and the control beam has a wavelength in a visible light wavelength range.

5. An optical imaging method using a metamaterial, comprising:
   a) providing an imaging beam toward a metamaterial array sensor which includes a plurality of unit cells made of a metamaterial and is positioned adjacent to an observation object;
   b) controlling a control beam provided to the unit cell to block an imaging beam incident on a unit cell;
   c) measuring a unit cell imaging beam transmission amount passing through the unit cell by measuring an imaging beam transmission amount of the metamaterial array sensor when the imaging beam passes through the unit cell and an imaging beam transmission amount of the metamaterial array sensor when the control beam is focused on the unit cell to block the imaging beam incident on the unit cell; and
   d) acquiring an optical analysis image of the observation object, which has a spatial resolution corresponding to a size of the metamaterial constituting the unit cell, by using the unit cell imaging beam transmission amount with respect to each of the plurality of unit cells, which is measured according to operation c).

6. The optical imaging method of claim 5, wherein a size of the metamaterial constituting the unit cell is smaller than a diffraction limit of the imaging beam.

7. The optical imaging method of claim 5, wherein the control beam has a spot size that is preset to correspond to a size of the metamaterial constituting the unit cell.

8. The optical imaging method of claim 5, wherein the imaging beam is in a form of a terahertz wave, and the control beam has a wavelength in a visible light wavelength range.

9. The optical imaging apparatus of claim 1, wherein a difference between transmission amounts of switch-on and switch-off corresponds to transmission in the unit cell.

* * * * *